United States Patent [19]

Freeman et al.

[11] 4,231,013

[45] Oct. 28, 1980

[54] VEHICLE BRAKE LIGHT ILLUMINATION SYSTEM

[75] Inventors: William H. Freeman, 765 W. Oak Dr., Glendale, Mo. 63122; David C. Golden, St. Peters, Mo.

[73] Assignee: William H. Freeman, Glendale, Mo.

[21] Appl. No.: 934,607

[22] Filed: Aug. 17, 1978

Related U.S. Application Data

[63] Continuation of Ser. No. 700,015, Jun. 25, 1976, abandoned.

[51] Int. Cl.$^2$ .......................... B60Q 1/26; B60Q 1/44
[52] U.S. Cl. .......................... 340/72; 340/66; 340/71; 340/669
[58] Field of Search .......................... 340/66, 69, 71, 72, 340/262, 669

[56] References Cited

U.S. PATENT DOCUMENTS

| | | | |
|---|---|---|---|
| 3,528,056 | 9/1970 | Voevodsky | 340/72 |
| 3,846,749 | 11/1974 | Curry | 340/72 |
| 4,107,647 | 8/1978 | Yoshino | 340/66 |

Primary Examiner—John W. Caldwell, Sr.
Assistant Examiner—Donnie L. Crosland
Attorney, Agent, or Firm—Kalish & Gilster

[57] ABSTRACT

A system whereby intensity of illumination of vehicle brake lights is increased responsively to relatively increased force applied on the vehicle brake pedal. A transducer installed in the pressurized brake fluid line produces an output signal proportionate to the braking force; which signal is utilized by circuitry to control the illumination of the brake lights to communicate to following drivers not only the fact that the brakes are being applied, but also the relative force of application for indicating the degree of travel arrest.

11 Claims, 5 Drawing Figures

VEHICLE BRAKE LIGHT ILLUMINATION SYSTEM

This is a continuation of application Ser. No. 700,015, filed June 25, 1976, now abandoned.

BACKGROUND AND SUMMARY OF THE INVENTION

All vehicles driven on streets or highways are required to be equipped with rear brake lights adapted to be illuminated upon actuation of the vehicle brakes to indicate that the vehicle can be expected to slow down or stop. Such lights are usually covered by a lens to project a red light upon energization. In view of the fact that with conventional systems the intensity of illumination of the brake lights is constant regardless of the force applied on the brakes, a following driver is hence unable to ascertain from such intensity whether the vehicle is merely slowing down, as in normal traffic flow, or making a hard, emergency stop.

The present invention, therefore, provides an automatic system whereby the intensity of illumination of the vehicle brake lights is a function of the force applied to the brake pedal. The driver of a vehicle equipped with the present system is thus enabled to communicate his braking intentions to following drivers who are correspondingly enabled to react promptly and effectively to an emergency situation thereby minimizing the possibility of a potentially injurious and damaging rear end collision.

While it is envisioned that the above-mentioned brake light function may be achieved by means of a hydraulic, or mechanically actuated potentiometer connected to the brake system to vary the illumination of the brake lights as a direct analog function of the braking force, it is preferred that such illumination increase in discrete steps responsively to the attainment of discrete plateaus in the magnitude of braking force exerted by the driver. It has been found that a solid-state circuit designed for producing the latter operation serving to scale an analog signal is more reliable and less expensive than a fully analog circuit.

Accordingly, it is an object of the present invention to provide a system wherein the intensity of illumination of vehicle brake lights will vary as a function of the force applied to the vehicle brakes.

It is another object of the present invention to provide a system of the character stated which is inexpensive, comprised of a limited number of sturdy, simple components, and one which may be provided as original vehicle equipment, or easily installed in vehicles incorporating conventional brake light systems.

It is another object of the present invention to provide a system of the character stated, the use of which reduces substantially the danger of vehicle accidents and especially rear end collisions with their usual customary personal injuries.

It is a still further object of the present invention to provide a system of the character stated wherein the intensity of illumination of the brake lights is effected in discrete steps, being responsive to predetermined plateaus of force being applied to the brakes to indicate to a following driver a corresponding degree of vehicle arrest.

It is a still further object of the present invention to provide a system of the character stated which is reliable and durable in usage.

DESCRIPTION OF THE PREFERRED EMBODIMENT

Figure 1:
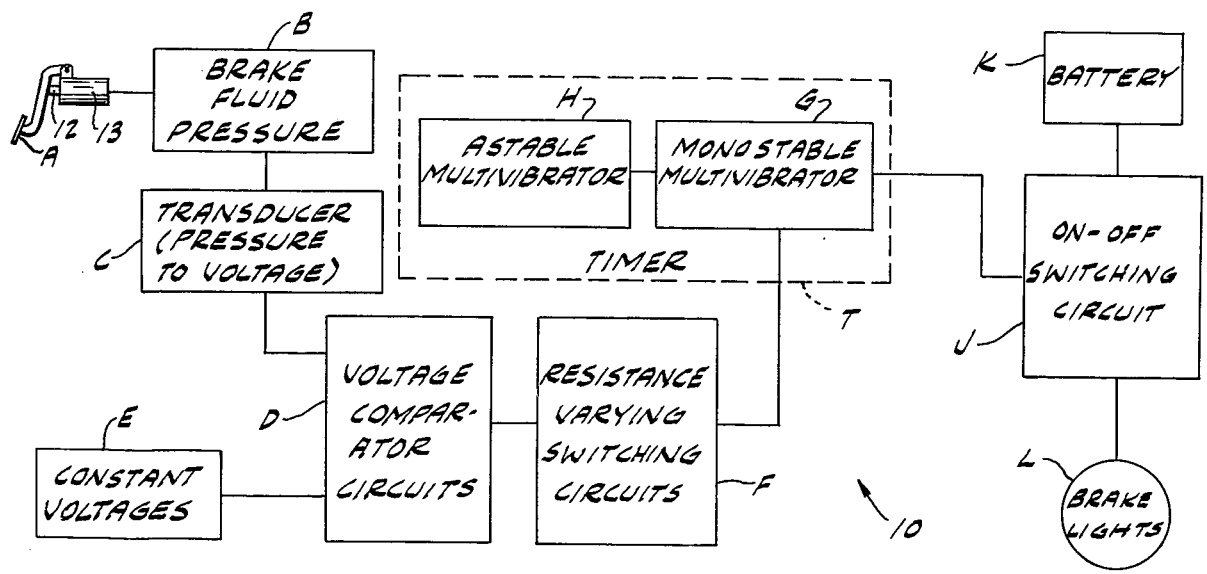
FIG. 1 is a functional block diagram of a vehicle brake light illumination system constructed in accordance with and embodying the present invention.

Referring now to the drawings which illustrate the preferred embodiment of the present invention, 10 generally indicates a vehicle brake light illumination system which comprises a conventional brake pedal A located within a vehicle (not shown) convenient to the operator thereof, which is engaged through the usual linkage 12 to a master cylinder 13 whereby upon force being applied to brake pedal A, a corresponding increase in the brake fluid pressure, indicated B, within master cylinder 13 is effected. Brake fluid pressure B is transmitted to a transducer C which produces an output signal having a voltage directly proportional to brake fluid pressure B; which signal is delivered to a plurality of voltage comparator circuits D which are connected to respective constant voltages E. Transducer output signal is compared, within circuits D, to the related voltage E for producing discrete control signals when the transducer output signal exceeds the related constant voltage. Voltage comparator circuits D are connected to a corresponding number of switching circuits F which latter are connected to a monostable multivibrator G of a timer T. Timer T also includes an astable multivibrator H in electrical communication with monostable multivibrator G. The aforesaid discrete control signals produced by comparator circuits D will cause a like number of switching circuits F to close thereby varying the voltage applied to monostable multivibrator G. Astable multivibrator H generates a pulse cycle of fixed, predetermined extent which is transmitted to the monostable multivibrator G. Monostable multivibrator G produces an output signal which is transmitted to on-off switching circuit J; the duration of said signal being dependent on the magnitude of the voltage applied from switching circuits F. The duration of said output signal within each pulse cycle controls the length of time that the on-off switching circuit J is activated to the "on" or closed state. On-off switching circuit J on one side is in circuit with a battery K and on its other side to brake lights L mounted on the rear of the vehicle. When said switching circuit J is closed current flows from battery K to brake lights L thereby illuminating the latter.

The longer the duration of the monostable multivibrator output signal per pulse cycle, i.e., the greater the duty cycle, the greater the portion of the cycle in which brake lights L are energized. If the on-off switching circuit J is closed during an increased portion of the cycle, then the brake lights will be perceived to glow with increased intensity. It should be noted as the cycle of the monostable multivibrator G is of limited duration, preferably about 700 microseconds, the human eye cannot detect any pulsation of the light being emitted from brake lights L but instead will perceive said lights as being continuously illuminated at an intensity less than that which would obtain if the battery was constantly connected to the brake lights L.

Figure 2:
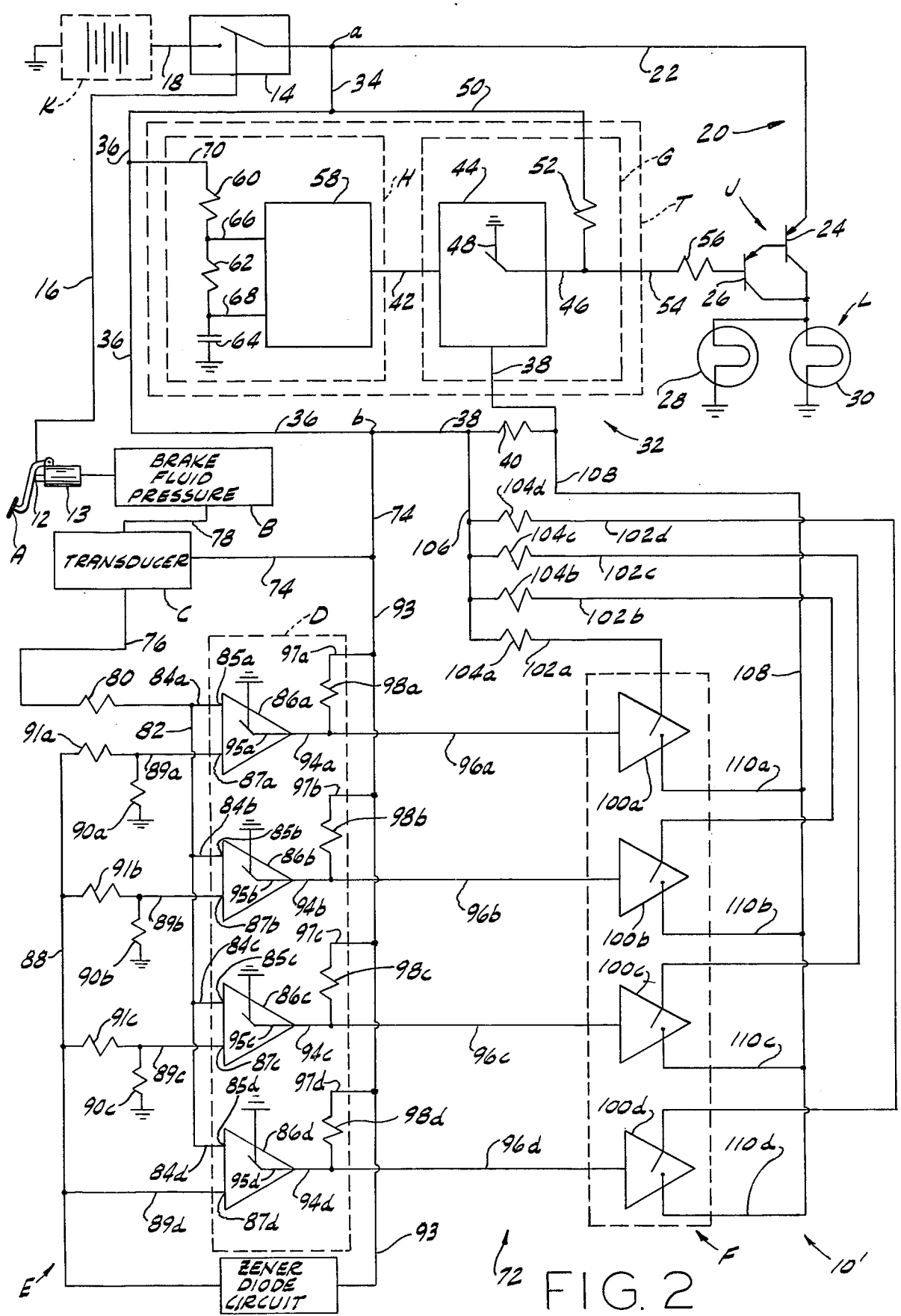
FIG. 2 is a partially schematic wiring diagram.

Referring now to FIG. 2, 10' designates a circuit wherein corresponding components are identified by the same letter utilized with respect to the description of FIG. 1, which includes a brake pedal A which is engaged through mechanical linkage 12 to master cylinder 13 wherein a brake fluid pressure B is developed responsive to a force being applied to pedal A. Mechanical linkage 12 controls a mechanical switch 14 through customary mechanical or hydraulic connection represented by 16. One side of switch 14 is connected to an electrical energy source, such as battery K, through lead 18, and the other side of switch 14 is connected to a power circuit 20, including power line 22, on-off switching circuit J and suitably grounded brake lights L. As shown, on-off switching circuit J is comprised of a well known Darlington pair circuit having conventionally connected transistors 24,26. Brake lights L include two parallel connected bulbs 28,30.

Tapping power from power line 22 at point a is a control circuit 32 including power tap lead 34 connected to line 36 which in turn is connected to input signal control line 38 having a control resistor 40 therein. Control line 38 is connected to monostable multivibrator G of timer T which also includes astable multivibrator H interconnected to monostable multivibrator G by means of line 42. Monostable multivibrator G is of conventional solid-state circuitry, indicated at 44, which operates to intermittently ground lead 46 connected thereto as schematically indicated by switch circuit 48. Lead 46 is connected to power line 22 through line 50, having a resistor 52 therein, and tap lead 34. At the junction of lead 46 and line 50 there is connected control signal line 54 which is connected to the base of transistor 26 of on-off switching circuit J; control line 54 having a resistor 56 therein. Astable multivibrator H is also of well known solid-state circuitry, indicated at 58, which produces a repetitive pulse cycle of a duration which is fixed by the values of the serially connected resistors 60,62 and grounded capacitor 64 which are connected to circuitry 58 by leads 66,68 and are connected to power line 22 through lead 70, line 36 and tap lead 34. A signal modifying circuit 72 receives power from point b in line 36 through lead 74, which power is fed via a further lead 75 to transducer C, which is of conventional, solid-state circuitry, to produce an output voltage in lead 76 proportionate to the magnitude of brake fluid pressure B communicated to transducer C through fluid line 78. Lead 76 includes a resistor 80 and is connected to a manifold lead 82 which in turn is connected to four input leads 84a, 84b, 84c, and 84d, which latter are respectively connected to non-inverting input terminals 85a, 85b, 85c, and 85d of well known solid-state voltage comparator circuits 86a, 86b, 86c, and 86d, respectively; said comparator circuits being collectively referred to as D. Each of voltage comparator circuits 86a, 86b, 86c, 86d includes an inverting input terminal 87a, 87b, 87c, 87d, respectively, which latter are connected to a constant voltage input line 88 through respective input leads 89a, 89b, 89c, 89d, respectively. Leads 89a, 89b, and 89c are grounded through resistors 90a, 90b, 90c, respectively, and located between the latter and line 88 are respective resistors 91a, 91b, and 91c. Line 88 communicates with a conventional zener diode circuit 92 which is powered by conductor 93 connected to lead 74. Zener diode circuit 92, line 88, leads 89a, 89b, 89c, 89d, and the respective associated resistors thereof together cooperate to provide the "constant voltages" referred to with respect to FIG. 1 and are together generally indicated by the letter E.

Resistors 90a, 90b, 90c, respectively, increase in value, while resistors 91a, 91b, 91c, respectively, decrease in value; therefore, as zener diode circuit 92 provides a constant voltage in line 88 which is applied directly to input terminal 87d through lead 89d, the respective inputs provided by leads 89c, 89b, and 89a to respective input terminals 87c, 87b, and 87a will be of progressively decreasing constant voltage with respect to the voltage at input terminal 87d.

Each of voltage comparator circuits 86a, 86b, 86c, 86d includes a respective, normally grounded lead 94a, 94b, 94c, 94d; current through the latter being controllably cut-off by schematically represented switch circuits 95a, 95b, 95c, 95d, respectively, as will be more fully explained hereinafter. Grounding leads 94a, 94b, 94c, 94d are connected to one end of respective signal lines 96a, 96b, 96c, 96d and to lead 93 via respective lines 97a, 97b, 97c, 97d which include respective resistors 98a, 98b, 98c, 98d. The other ends of signal lines 96a, 96b, 96c, 96d are respectively connected to normally open solid-state switching circuits 100a, 100b, 100c, 100d, collectively referred to as F, for controlling the closing thereof. Switching circuits 100a, 100b, 100c, 100d are connected on one side thereof to respective conductors 102a, 102b, 102c, 102d which include signal modifying resistors 104a, 104b, 104c, 104d, respectively; all of said conductors being connected to one side of control resistor 40 in control line 38 through common line 106. The other side of switching circuits 100a, 100b, 100c, 100d are respectively coupled to another common line 108 through respective leads 110a, 110b, 110c, 110d; common line 108 being joined to the other side of control resistor 40.

It is noted that all of the circuits not shown in detail herein are well known, inexpensive, and readily available as solid-state components. For example, a quad monolithic integrated circuit voltage comparator module available from the National Semiconductor Company (part No. LM 139) may perform the function of the voltage comparator circuits D; a quad complementary metal oxide semiconductor bilateral switch obtainable from the RCA Company (Part No. CD 4016) may be utilized for the switching circuits F; a dual timer available from the National Semiconductor Company (Part No. LM 556) is adaptable in a well known manner for use as timer T. It is further noted that conventional power input and grounding connections for operation of these circuits have been omitted in order to simplify the circuit diagram.

Figure 3:
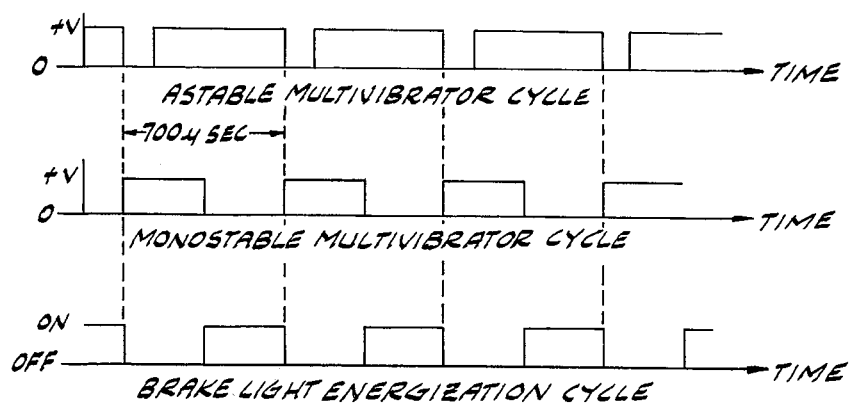
FIG. 3 is a graph illustrating the relationship of the outputs of the astable multivibrator and the monostable multivibrator, utilized in the circuit of FIG. 2 along with the illumination cycle of the brake lights as a function of time.

The above-mentioned electronic circuit 10' operates to vary the intensity of illumination of vehicle brake lights 28, 30 in discrete steps responsive to the degree of pressure being applied to the vehicle brake pedal A in the following manner:

When brake pedal A is in the non-actuated position, switch 14 will be open, blocking current flow through the circuit, and brake lights L will not be illuminated. In the event the operator applies force to brake pedal A to depress same, mechanical or hydraulic connection 16 closes switch 14 to supply power from battery K to activate power circuit 20, control circuit 32, and signal modifying circuit 72. Current flows through power line 22, tap lead 34, line 36, and line 70 to astable multivibrator H which is thereby energized, and as a result of the values chosen for resistors 60,62, and capacitor 64, astable multivibrator circuit 58 will produce a pulse cycle of a selected, constant duration which is communicated to monostable multivibrator circuit 44 through line 42. Current is also supplied to monostable multivibrator circuit 44 through line 36 and control line 38 having control resistor 40. Referring to FIG. 3, astable multivibrator H will produce repetitive pulse cycles of constant duration, for example, on the order of 700 microseconds, which are utilized by monostable multivibrator G to initiate repetitive cycles of equal duration within which cycles a period of plus voltage (+V), and a period of zero voltage (0) is induced. Upon each commencement of an astable multivibrator cycle the +V state is initiated as shown in FIG. 3. The duration of the period of plus voltage is controlled by the magnitude of the voltage input signal supplied through control line 38. When the cycle of monostable multivibrator G is in the +V state, current through tap line 34 passing through resistor 52 in line 50 will be grounded through lead 46 and switch circuit 48; however, when the cycle is in the "0" state, switch circuit 48 will open thereby permitting the current in line 50 to be applied to on-off switching circuit J through signal line 54. Current flow in signal line 54 acts as a control signal for on-off switching circuit J; therefore, when current is permitted to flow through line 54 transistor 26 is fired, and power is supplied to energize bulbs 28,30 through power line 22 and on-off switching circuit J. It can, therefore, be seen in FIG. 3 that the brake lights L will be energized, or on, only during a period of each of the repeating cycles; the duration of the energization period being equal to the duration of the period in which the monostable multivibrator cycle is in the "0" state.

The duration of the period in which the monostable multivibrator cycles are in the "0" state is controlled by the voltage input signal carried by control line 38 which signal is dependent upon the effective resistance in control line 38. The value of control resistor 40 in control line 38 is selected to provide a voltage to circuit 44 which will terminate the +V state of each cycle of the monostable multivibrator approximately half-way through each cycle; therefore, the brake lights L will be energized for a period of approximately half of each of the monostable multivibrator cycles. It is noted that the intermittent energization of bulbs 28,30 is of sufficient frequency to prevent the filaments thereof from cooling during the "off" period of the cycle; therefore, the bulbs will appear to glow continuously at approximately a fifty percent intensity level, and no light pulsation effect will be sensed by the human eye.

The effective resistance in control line 38 is selectively modified in discrete steps by the signal modifying circuit 72 in order to increase the intensity of lights L responsively to increased braking force. When the operator increases the force on brake pedal A, the brake fluid pressure B rises and transducer C correspondingly raises the voltage in leads 76 and 82. At such time the voltage applied to non-inverting input terminal 85a, through input lead 84a exceeds the constant voltage applied to inverting input terminal 87a, switch circuit 95a will open, thereby no longer grounding the current carried by lead 94a and line 97a supplied thereto from conductor 93 and line 36; consequently, the current in line 97a is permitted to flow to switching circuit 100a through signal line 96a. Upon receiving the current signal from line 96a, switching circuit 100a places in circuit conductor 102a and lead 110a thereby adding modifying resistor 104a in parallel circuit with control resistor 40 resulting in the lowering of the effective resistance in control line 38. Lowering of said effective resistance results in a voltage signal through control line 38 of increased magnitude and a corresponding increase in the duration of the "on" period within each cycle of brake lights L causing them to glow with increased intensity.

Due to the fact that the constant voltages applied to inverting input terminals 87a, 87b, 87c, 87d progressively increase respectively, further incremental increases in the intensity of illumination of brake lights L are effected by signal modifying circuit 72 as brake pedal A is depressed with a force exceeding predetermined plateaus; i.e., in response to rising brake fluid pressure, the remaining voltage comparator circuits 86b, 86c, 86d will be progressively switched to a state wherein their associated switching circuits 100a, 100b, 100c, respectively, are closed to thus add progressively into parallel circuit with resistors 40 and 104a, the remaining modifying resistors 104b, 104c, 104d, respectively, thereby increasing the input voltage signal through control line 38 accordingly and consequently further increasing the intensity of illumination of lights L. It should be clear that, conversely, as the pressure of the brake fluid is diminished, the number of resistors 104a, 104b, 104c, 104d will decline accordingly, resulting in the attenuation of the illumination of the brake lights L.

Figure 4:
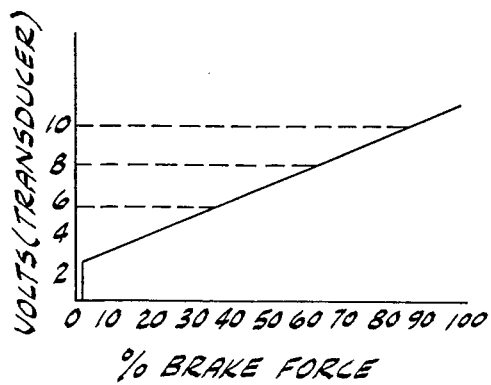
FIG. 4 is a graph showing an exemplary output voltage of the transducer used in the circuit of FIG. 2 as a function of the percent of brake force applied to the vehicle brake pedal.
Figure 5:
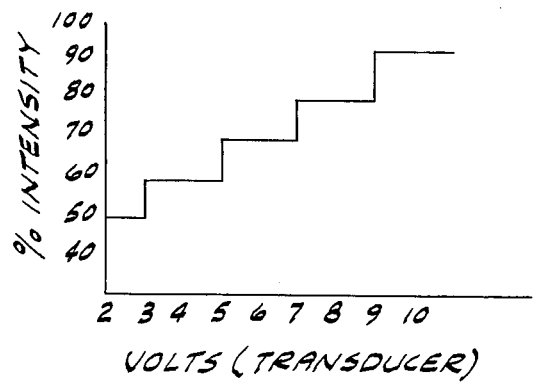
FIG. 5 is a graph illustrating the percent intensity of illumination of the vehicle brake lights as a stepped function of the output voltage of the transducer.

Referring to FIGS. 4 and 5, according to a preferred operation of the invention, upon a minimal force being applied to brake pedal A (approximately two percent of the maximum brake force) switch 14 will close and transducer C will immediately provide an output voltage of 2 volts. As seen in FIG. 4, as the brake force rises, the output voltage of transducer C rises accordingly. The horizontal dashed lines represent the constant voltage applied to the respective comparator circuits of circuits D and, therefore, the plateaus of voltage which must be exceeded to intensify the illumination of the lights. As illustrated in FIG. 5, each time the transducer output voltage applied to the circuits D exceeds the respective constant voltages (3, 5, 7, and 9 volts), the intensity of illumination of lights L will rise to an increased discrete level (60, 70, 80, and 90 percent of the maximum intensity). Therefore, it can be seen that the intensity levels of lights L are directly related as a stepped function to the magnitude of force applied to brake pedal A.

While the circuit described provides for four discrete increases in brake light intensity corresponding to the four voltage comparator circuits 86a, 86b, 86c, 86d, it is readily apparent that further steps may be added merely by the augmentation of further voltage comparator circuits.

Having described our invention what we claim and desire to obtain by Letters Patent is:

1. An improved brake light illumination system for a vehicle having a force actuated brake control and at least one brake light, the improvement comprising transducer means engaged to said brake control for generating an electrical signal proportionate to the magnitude of force applied to said brake control, and circuit means connecting said transducer means and said at least one light for intermittently energizing said light at a duty cycle providing an intermittent rate dependent upon the magnitude of said electrical signal, said rate being sufficiently great that the human eye cannot detect any pulsation of the light being emitted from said brake light, thereby steadily illuminating said light at intensity levels which are directly related to the magnitude of force applied to said brake control, said circuit means including a signal modifying circuit responsive to said electrical signal for converting said electrical signal to a control signal having a multiplicity of discrete steps, and a control circuit responsive to said multiplicity of steps of said control signal for causing said duty cycle of energizing said light to provide a corresponding multiplicity of discrete intensity levels.

2. The improved brake light illumination system according to claim 1 and further characterized by said circuit means including a power circuit through which a controlled current is passed to illuminate said light, said control circuit being connected to said power circuit for intermittently generating a control signal to permit the flow of current through said power circuit at a preselected minimum intermittent rate thereby illuminating said light at a preselected minimum intensity, said signal modifying circuit being connected to said control circuit for modifying said control signal in response to an increase in the force applied to said brake control to permit the flow of current through said power circuit at an intermittent rate greater than said preselected minimum rate and thereby illuminating said light such that each of said multiplicity of intensity levels is greater than said preselected minimum intensity.

3. The improved brake light illumination system according to claim 2 and further characterized by said control circuit including a timer productive of a repetitive cycle of fixed duration; a control line communicating between an electrical energy source and said timer; said timer being adapted to receive an input signal of variable magnitude through said control line; said timer altering said control signal as a function of the magnitude of said input signal.

4. The improved brake light illumination system according to claim 3 and further characterized by said power circuit including a normally deactivated Darlington pair circuit blocking current flow to said light; said pair circuit being activated to permit current flow to said light only upon the application of said control signal thereto; said timer permitting application of said control signal to said pair circuit during a selective period of each of said cycles; the duration of said periods being directly related to the magnitude of said input signal.

5. The improved brake light illumination system according to claim 4 and further characterized by said timer including an astable multivibrator for generating said cycles and a monostable multivibrator for determining the duration of said selective periods in response to the magnitude of said input signal.

6. The improved brake light illumination system according to claim 4 and further characterized by the magnitude of said input signal being directly dependent of the effective resistance in said control line; said signal modifying circuit being connected to said control line to change the value of said effective resistance in discrete levels corresponding to changes of respective predetermined magnitudes in said force.

7. The improved brake light illumination system according to claim 2 and further characterized by said control circuit including a timer productive of a repetitive cycle of fixed duration; a control line communicating between an electrical energy source and said timer; said timer being adapted to receive an input signal of variable magnitude through said control line; said timer altering said control signal as a function of the magnitude of said input signal; the magnitude of said input signal being directly dependent on the effective resistance in said control line; and said signal modifying circuit being connected to said control line to change the value of said effective resistance in discrete levels corresponding to changes of respective predetermined magnitudes in said force.

8. The improved brake light illumination system according to claim 7 and further characterized by said control line having a control resistor of fixed value therein and said signal modifying circuit including a plurality or parallel, fixed-value modifying resistors adapted to be selectively connected in parallel with said control resistor to thereby change the effective resistance in said control line.

9. The improved brake light illumination system according to claim 9 and further characterized by said signal modifying circuit including a plurality of normally open switching circuits and a corresponding plurality of voltage comparator circuits; each of said switching circuits being serially connected with a respective one of said modifying resistors; said voltage comparator circuits each being connected to said transducer means and adapted to receive said electrical signal therefrom; each of said voltage comparator circuits being connected to a respective one of said switching circuits through a signal line; said voltage comparator circuits being effective to progressively provide a switching signal through a respective signal line to a respective switching circuit upon the voltage of said electrical signal progressively exceeding the value of predetermined voltage plateaus of increasing magnitude; said switching circuits being adapted to permit current flow through a respective modifying resistor upon the application of said switching signal to the respective switching circuit; whereby as the voltage of said electrical signal progressively exceeds said predetermined voltage plateaus said modifying resistors will progressively be switched into parallel circuitry with said control resistor.

10. The improved brake light illumination system according to claim 1 and further characterized by said brake control including a brake pedal connected to a pressurized fluid system; said transducer means is connected to said fluid system and produces a voltage signal proportionate to the pressure in said fluid system.

11. An improved brake light illumination system for a vehicle having a force actuated brake control and at least one brake light, the improvement comprising transducer means engaged to said brake control for generating an electrical signal proportionate to the magnitude of force applied to said brake control, and circuit means connecting said transducer means and said at least one light for intermittently energizing said light at a duty cycle providing an intermittent rate dependent upon the magnitude of said electrical signal, said rate being sufficiently great that the human eye cannot detect any pulsation of the light being emitted from said brake light, thereby steadily illuminating said light at intensity levels which are directly related to the magnitude of force applied to said brake control, said circuit means further including a power circuit through which a controlled current is passed to illuminate said light, a control circuit being connected to said power circuit for intermittently generating a control signal to permit the flow of current through said power circuit at a preselected minimum intermittent rate thereby illuminating said light at a preselected minimum intensity, a signal modifying circuit connected to said control circuit for modifying said control signal in response to an increase in the force applied to said brake control to permit the flow of current through said power circuit at an intermittent rate greater than said preselected rate and thereby illuminating said light at an intensity greater than said preselected minimum intensity, said signal modifying circuit being effective to modify said control signal in a multiplicity of discrete steps corresponding to changes of respective predetermined magnitudes in said force and correspondingly illuminating said light with intensities of discrete levels, said control circuit including a timer productive of a repetitive cycle of fixed duration, a control line communicating between an electrical energy source and said timer, said timer being adapted to receive an input signal of variable magnitude through said control line, said timer altering said control signal as a function of the magnitude of said input siganl, the magnitude of said input signal being directly dependent upon effective resistance in said control line, and said signal modifying circuit being connected to said control line to change the value of effective resistance in said control line, and said signal modifying circuit being connected to said control line to change the value of said effective resistance in discrete levels corresponding to changes of respective predetermined magnitudes in said force, said control line having a control resistor of fixed value therein and said signal modifying circuit including a plurality of parallel, fixed-value modifying resistors adapted to be selectively connected in parallel with said control resistor to thereby change the effective resistance in said control line.

* * * * *

UNITED STATES PATENT OFFICE
CERTIFICATE OF CORRECTION

Patent No. 4,231,013　　　　　　　　Dated October 28, 1980

Inventor(s)　William H. Freeman and David C. Golden

It is certified that error appears in the above-identified patent and that said Letters Patent are hereby corrected as shown below:

Claim 6, Column 7, Line 66, change "of" to ---on---.

Claim 9, Column 8, Line 27, change "9" to ---8---.

Signed and Sealed this

Tenth Day of February 1981

[SEAL]

Attest:

RENE D. TEGTMEYER

Attesting Officer　　Acting Commissioner of Patents and Trademarks